(12) United States Patent
Alfieri, III

(10) Patent No.: US 8,915,027 B1
(45) Date of Patent: Dec. 23, 2014

(54) EDGING SYSTEM FOR UNIT PAVEMENT SYSTEM

(71) Applicant: James A. Alfieri, III, Kirtland, OH (US)

(72) Inventor: James A. Alfieri, III, Kirtland, OH (US)

(73) Assignee: James A. Alfieri, III, Kirtland, OH (US)

( * ) Notice: Subject to any disclaimer, the term of this patent is extended or adjusted under 35 U.S.C. 154(b) by 0 days.

(21) Appl. No.: 14/039,062

(22) Filed: Sep. 27, 2013

(51) Int. Cl.
*E02D 27/00* (2006.01)
*E01C 11/22* (2006.01)

(52) U.S. Cl.
CPC .................................. *E01C 11/221* (2013.01)
USPC .................. 52/102; 404/47; 404/68

(58) Field of Classification Search
USPC .......................... 404/47, 68; 405/262; 52/102
See application file for complete search history.

(56) References Cited

U.S. PATENT DOCUMENTS

| | | | |
|---|---|---|---|
| 1,226,149 A * | 5/1917 | Warmoth ........................... 238/9 |
| 1,764,029 A | 6/1930 | Miller |
| 3,429,241 A * | 2/1969 | Burton ............................. 404/51 |
| 3,613,323 A * | 10/1971 | Hreha ........................... 52/169.5 |
| 4,710,062 A * | 12/1987 | Vidal et al. ..................... 405/262 |
| 5,212,917 A | 5/1993 | Kurtz et al. |
| 5,993,107 A * | 11/1999 | Bauer .............................. 404/43 |
| 6,171,015 B1 * | 1/2001 | Barth et al. ..................... 404/34 |
| 6,185,893 B1 * | 2/2001 | Gaston ............................ 52/385 |
| 6,379,078 B1 * | 4/2002 | Zwier ................................ 404/7 |
| 6,874,975 B2 * | 4/2005 | Hilfiker et al. ................. 405/262 |
| 7,344,334 B2 * | 3/2008 | Thorkelson ..................... 404/29 |
| D586,005 S * | 2/2009 | Schumaker et al. ......... D25/119 |
| 7,963,718 B2 * | 6/2011 | Zwier et al. ....................... 404/7 |
| 7,967,524 B2 | 6/2011 | Jones |
| 8,266,844 B2 | 9/2012 | Kurtz et al. |
| 2008/0163566 A1 | 7/2008 | Bella |
| 2009/0016849 A1 * | 1/2009 | Riccobene et al. ........... 411/496 |
| 2009/0304456 A1 * | 12/2009 | Taylor et al. .................. 405/262 |
| 2010/0121328 A1 * | 5/2010 | Reitzig et al. ................... 606/71 |
| 2011/0173901 A1 * | 7/2011 | Runkles et al. ................ 52/102 |

* cited by examiner

*Primary Examiner* — Thomas B Will
*Assistant Examiner* — Katherine Chu
(74) *Attorney, Agent, or Firm* — Rankin, Hill & Clark LLP

(57) ABSTRACT

A method of installing an edging system for a unit pavement system includes positioning a paver-contacting surface of an edge restraint against an edge of a unit pavement system including a plurality of paver units, and driving a plate-like stake in a generally horizontal direction underneath at least one paver unit of the plurality of paver units and into a granular material layer upon which the unit pavement system is supported such that the plate-like stake is operatively connected with the edge restraint. The edge restraint includes a horizontal section and a vertical section joined at a corner. The vertical section extends upwardly from and generally perpendicular to the horizontal section. An edging system for a unit pavement system is also disclosed.

20 Claims, 12 Drawing Sheets

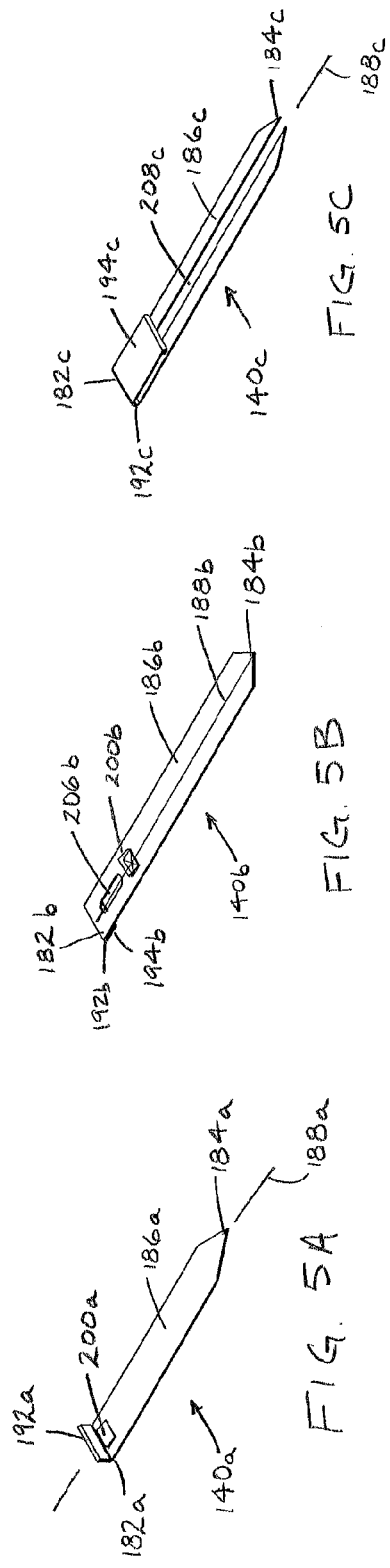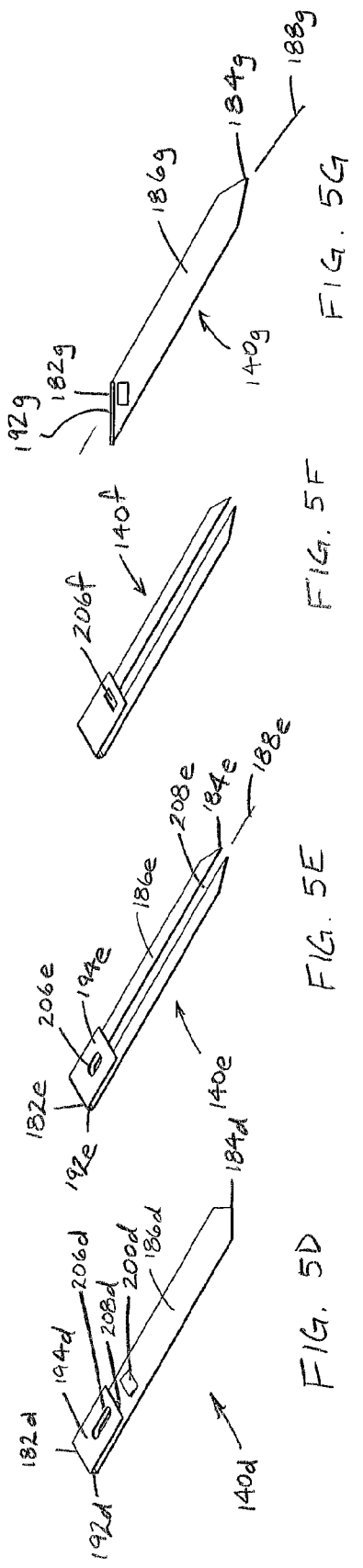

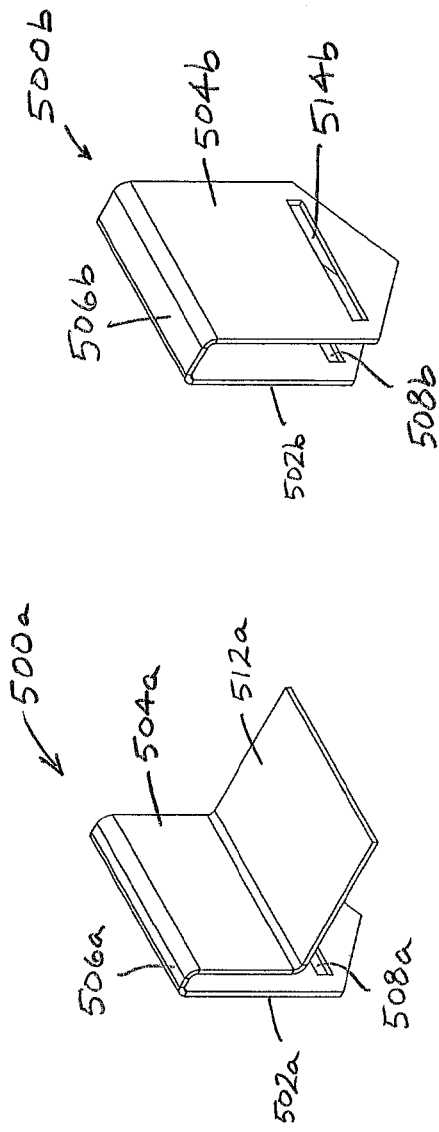
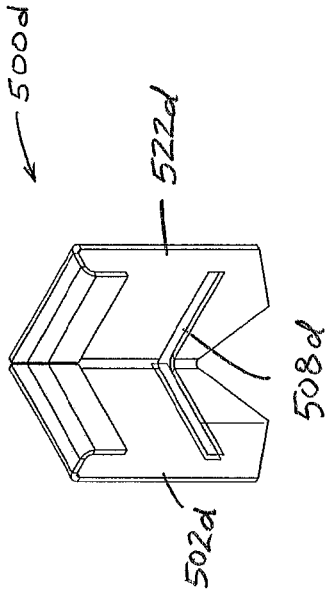
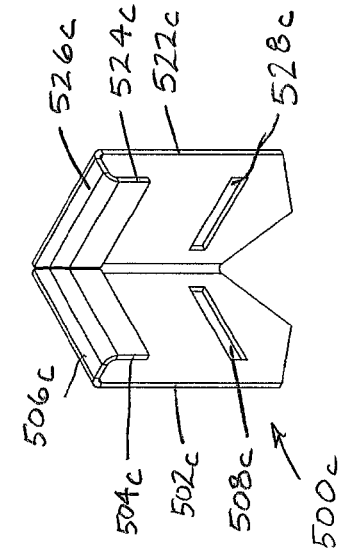
FIG. 11A
FIG. 11B
FIG. 11C
FIG. 11D

EDGING SYSTEM FOR UNIT PAVEMENT SYSTEM

BACKGROUND

Unit pavement systems are made up of a plurality of paver units laid on a granular material, e.g., sand or stone aggregate. The paver units are made individually or in combination from a variety of materials such as concrete, clay, natural stone, asphalt, or synthetic materials. An "L-type" edge restraint system is the most popular edge restraint system used in the horizontal surface installation of unit pavement systems. The responsibility of the edge restraint system is to prevent the paver units from horizontal movement over time.

The L-type edge restraint is primarily anchored by nails, spikes, stakes or screws driven through fastener openings provided in a horizontal section, also referred to as the base flange, of the edge restraint and then into the granular sub-base below. The sub-base upon which the unit pavement system and the L-type edge restraint is installed typically extends beyond the edge of the unit pavement system a distance equal to the installed base depth. This provides for load transfer, edge restraint stability, and a base structure to hold the anchoring fasteners in place. There are typically two different types of installation techniques used when installing L-type edge restraints.

The first and most common installation method is referred to as exterior base flange placement. In this method, the base flange, or horizontal section, is installed on the outside of the edge of the unit pavement surface. Ten-inch steel spikes are then driven through fastener openings in the base flange and into the sub-grade below. The number of spikes needed varies depending on the load of the unit pavement system after installation.

The exterior base flange placement installation method is most preferred by installers because it allows the installation of the unit pavement system to be completed prior to edge restraint placement. This installation method also allows for the popular "rip cut" that is typically used by installers for time savings. A "rip cut" is defined as a cutting process used by the installer whereby the paver units are overlaid past a finished line, marked, and then cut along the finished line using a portable hand saw to form a finished edge of the unit pavement system. By not having the edge restraint in place, the paver units do not have a specific tolerance to meet along the perimeter of the unit paving system. This process requires less time in cutting labor and allows for a variance in the finished pavement edges or perimeters that is not available with an interior flange placement method that is to be discussed below.

When the "L-type" edge restraint is installed using the exterior base flange placement method, the edge restraint typically moves from its original position over time. The edge restraint is held in place by the vertical force on the spike as the spike is engaged with the sub-base and the weight of any backfill material on the base flange. Snow, rain, ground movement, traffic load, erosion, frost and terrestrial sub-base composition force the edge restraint and the spike to move both vertically and horizontally out of place. This can result in the spike and the edge restraint separating from the sub-base. In other cases, the spike can separate from the edge restraint. When either case occurs, the final result is a failure of the "L-type" edge restraint to stay in place making the edge restraint less effective in holding the paver units in place.

The second installation method for use with the "L-type" edge restraint is referred to as the interior base flange placement. In this method, the base flange is installed facing toward the finished edge of the unit paving system. This installation is least preferred by installers because the edge restraint needs to be installed and anchored prior to the finished edge of the unit pavement system being installed. In this installation, the paver units must be individually cut and then placed in between the installed paver units and next to the vertical section of the already installed edge restraint. This method is much more time consuming than the exterior base flange placement method. The interior base flange placement method requires individually cutting paver units, precise measurement of edging placement, and results in additional labor time to fix units that do not line up with the edge restraint during installation.

With the interior base flange placement installation method, the weight of the paver units along the edge of the unit pavement system can help restrain the edge restraint from movement. One disadvantage with this method, however, is that the outer edges of the paver units along the edge of the unit pavement system sit on a different foundation structure, i.e., the base flange of the edge restraint, as compared to the remainder of the paver units along the edge, which sit on granular material. This causes the paver units along the edge to tip toward the interior of the unit pavement system. This tipping direction can cause water drainage issues because the free flow of water away from the unit pavement edge is impeded.

There is also another type of edge restraint generally referred to as a permeable pavement edge restraint. Permeable pavement edge restraints are primarily used for unit pavement systems that have a base composition made of larger aggregate materials having no small or fine particles. Such a base composition does not compact as densely as traditional aggregate. Since the material is open-graded and not finely compacted, the use of common fasteners, e.g., the 10-inch spike mentioned above, is unavailable because the common fasteners will not stay in place as they would in a traditional finer aggregate base. A geo-grid or base plate is typically installed on the sub-base prior to the unit pavers being installed. The permeable pavement edge restraints are then fastened to a capture plate or clip that holds the edge restraint to the geo-grid or base plate. Generally, this system requires additional labor and materials and is more costly than a typical L-type edge restraint system.

SUMMARY

In view of the foregoing, a method of installing an edging system for a unit pavement system includes positioning a paver-contacting surface of an edge restraint against an edge of a unit pavement system including a plurality of paver units, and driving a plate-like stake in a generally horizontal direction underneath at least one paver unit of the plurality of paver units and into a granular material layer upon which the unit pavement system is supported such that the plate-like stake is operatively connected with the edge restraint. The edge restraint includes a horizontal section and a vertical section joined at a corner. The vertical section defines the paver-contacting surface and extends upwardly from and generally perpendicular to the horizontal section.

An edging system for a unit pavement system includes an edge restraint and a plate-like stake operatively connected with the edge restraint. The edge restraint includes a horizontal section and a vertical section joined at a corner. The vertical section extends upwardly from and generally perpendicular to the horizontal section and defines a paver-contacting surface configured to contact an edge of the unit pavement system. The plate-like stake operatively connects with the edge restraint adjacent to and slightly offset from the corner of the edge restraint. The plate-like stake is sufficiently rigid so as to be driven into coarse sand with a hammer underneath paver units of the unit pavement system. The plate-like stake includes a substantially horizontally disposed portion extending away from the paver-contacting surface of the edge restraint and underneath paver units of the unit pavement system.

BRIEF DESCRIPTION OF THE DRAWINGS

FIGS. 5A-5G are perspective views of alternative plate-like stakes for edging systems.

FIGS. 11A-11D are perspective views of alternative clips for edging systems.

DETAILED DESCRIPTION

Figure 1:
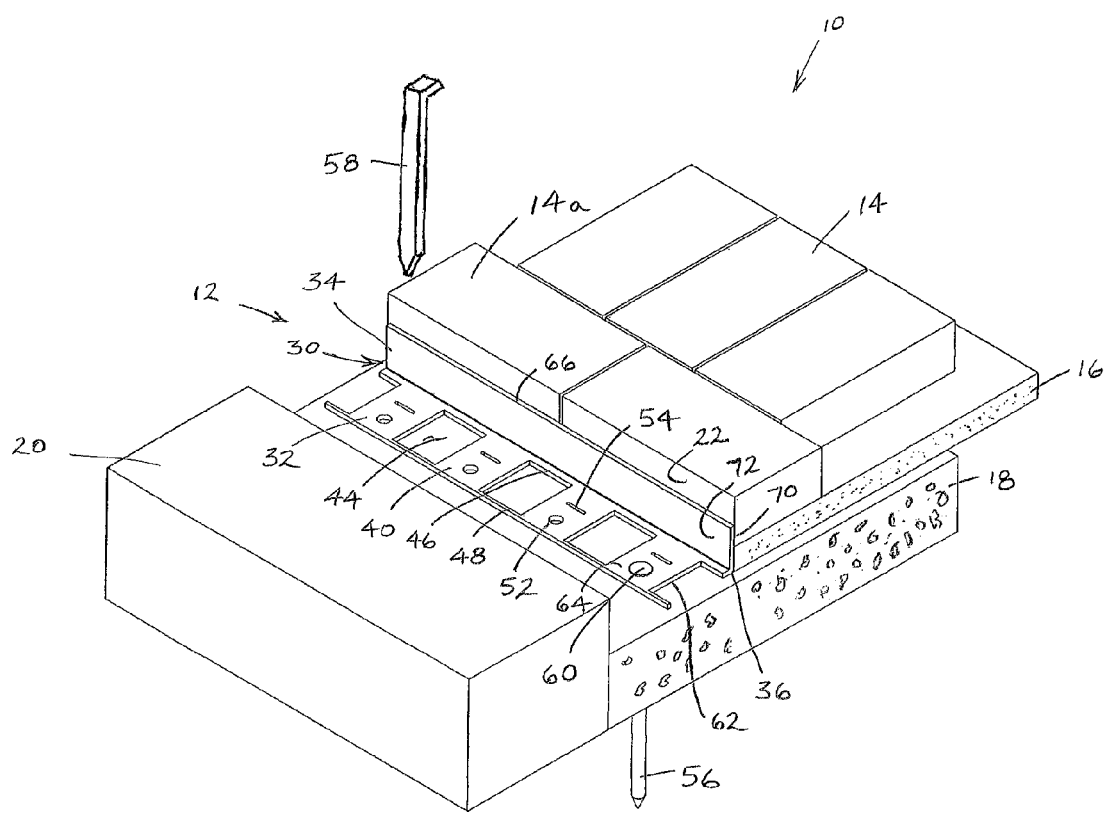
FIG. 1 is a perspective view of a unit pavement system and an edging system for retaining the unit pavement system.

FIG. 1 depicts a unit pavement system 10 and an edging system 12 for retaining the unit pavement system. The unit pavement system 10 is made up of a plurality of individual paver units 14. The paver units 14 are laid on a granular material layer, which can be a sand layer 16 overlaying a crushed limestone layer 18. Other types of aggregate materials can also be used, which are known to persons of ordinary skill in the art. The sand layer 16 and the crushed limestone layer 18 are typically laid upon a compacted or virgin earth (not shown). The area where the unit pavement system 10 is to be installed can be excavated with the crushed limestone layer 18 and the sand layer 16 installed after excavation. The excavation can result in a finished grade 20 being located near an edge 22 of the unit pavement system.

The edging system 12 includes an edge restraint 30, which can have an L-shape, having a horizontal section 32 and a vertical section 34 joined at a corner 36. The edge restraint 30 is made from a rigid material, such as a rigid plastic, metal or composite material. Typically, the edge restraint 30 is an elongate member having a length much greater than a height and width.

The horizontal section 32, which can also be referred to as a base flange, of the edge restraint 30 rests on granular material (as shown in FIG. 1 the crushed limestone layer 18) when installed. The horizontal section 32 includes a plurality of anchoring sections 40 separated by respective voids 44. Each anchoring section 42 is made up of the material, e.g. rigid plastic, metal or composite material, from which the edge restraint 30 is made while the voids 44 are devoid of this material. The anchoring sections 42 are connected to one another by a proximal web 46, which is adjacent to the vertical section 34, and a distal web 48, which is spaced from the vertical section. Two adjacent anchoring sections 42, a respective proximal web 46 and a respective distal web 48 each surround a respective void 44. Fastener openings, such as a round fastener opening 52 and a rectangular fastener opening 54, extend through each anchoring section 42. Fasteners, such as a nail spike 56 and a flat nail stake 58, can be received in the respective openings 52, 54. The nail spike 56 is driven through the round fastener opening 52 until a head 60 of the nail spike 56 contacts the horizontal section 32. The horizontal section 32 defines a lower surface 62 of the edge restraint 30 that contacts the granular material, such as the crushed limestone layer 18. An upper surface 64 of the horizontal section 32 is typically covered with backfill after the installation of the edging system is completed.

The vertical section 34 of the edge restraint 30 extends upwardly from and generally perpendicularly to the horizontal section 32 to an upper edge 66 of the edge restraint 30. The vertical section 34 defines a paver-contacting surface 70 configured to contact the edge 22 of the unit pavement system 10. The vertical section 32 also includes a backfill-contacting surface 72, which is typically covered by backfill when the installation is complete. The vertical section 34 extends upwardly from the horizontal section 32 about 1¾ inches in the illustrated embodiment, and the upper edge 66 of the edge restraint 30 is underneath the backfill when the installation of the unit pavement system 10 is completed.

The edging system 12 depicted in FIG. 1 shows the exterior base flange placement installation method described above. In an alternative arrangement, the edge restraint 30 could be situated so that the paver units 14a along the edge 22 are set on the horizontal section 32, making surface 72 of the vertical section 34 the paver-contacting surface and surface 70 the backfill-contacting surface. Such an installation would be according to the interior base flange placement installation method discussed above. Each of these methods can result in undesirable movement of the edge restraint 30 over time.

Figure 2:
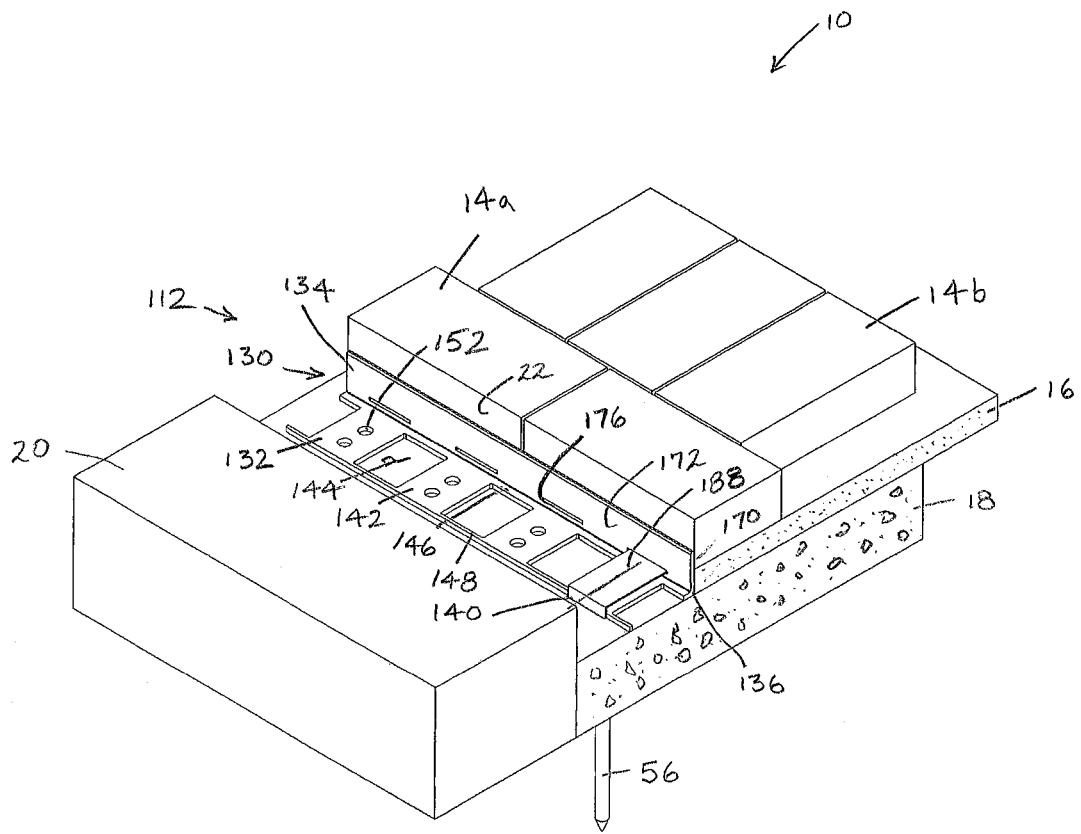
FIG. 2 is a perspective view of a unit pavement system and another edging system.
Figure 3:
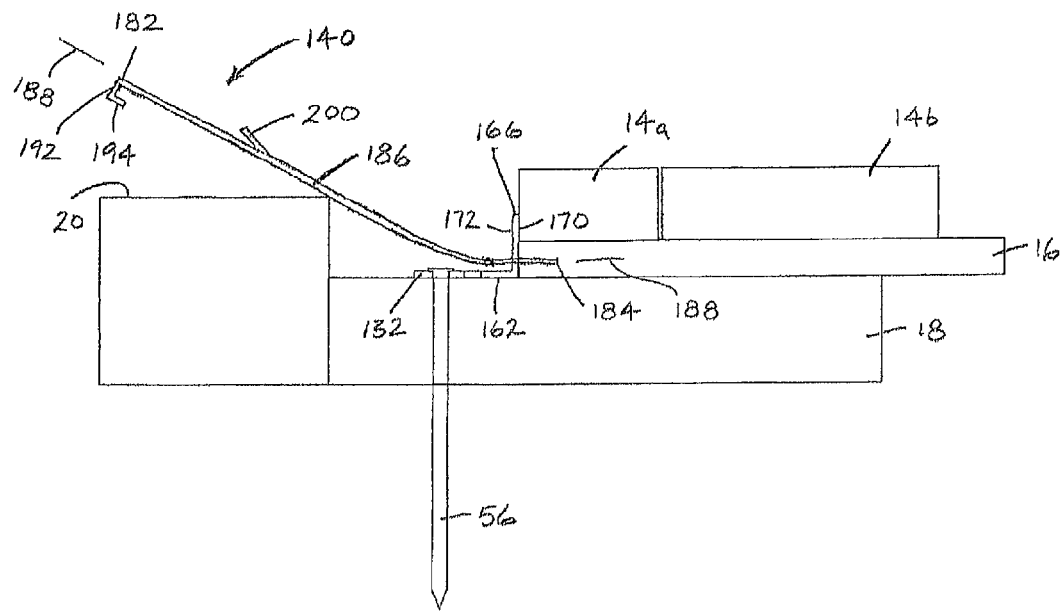
FIG. 3 is a cross-sectional view of the unit pavement system and the edging system of FIG. 2 with a plate-like stake prior to being driven into a granular material.
Figure 4:
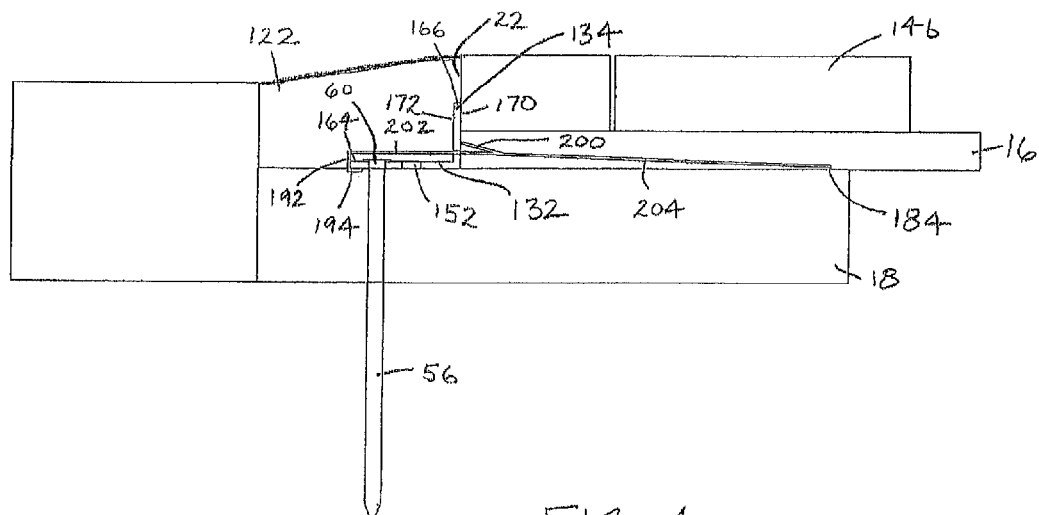
FIG. 4 is a cross-sectional view of the unit pavement system and the edging system of FIG. 2 with a plate-like stake driven into the granular material.

FIGS. 2-4 depict the unit pavement system 10 as shown in FIG. 1 and a novel edging system 112 to restrain the unit pavement system. The edging system 112 includes an edge restraint 130 including a horizontal section 132 and a vertical section 134 joined at a corner 136. The edging system 112 differs from the edging system 12 depicted in FIG. 1 in that the edging system 112 includes a plate-like stake 140 operatively connected with the edge restraint 130.

The edge restraint 130, similar to the edge restraint 30 depicted in FIG. 1, is made from a rigid material, such as a rigid plastic, metal or composite material. Similar to the edge restraint 30 depicted in FIG. 1, the edge restraint 130 depicted in FIG. 2 is an elongate member having a length greater than a width and height. The edge restraint 130 depicted in FIG. 2 differs from the edge restraint depicted in FIG. 1 in that the plate-like stake 140, and thus the edge restraint 130 operatively connected thereto, is retained by the weight of some of the paver units 14 of the unit pavement system 10 to restrain vertical and horizontal movement of the edge restraint 130.

The horizontal section 132 of the edge restraint 130 includes a plurality of anchoring sections 142 separated by respective voids 144. The horizontal section 132 also includes a proximal web 146 disposed adjacent the vertical section 134 and a distal web 148 spaced from the vertical section 134. Each void 144 is bounded by two adjacent anchoring sections 142, a respective proximal web 146 and a respective distal web 148. As depicted, the area of each void 144 is greater than the area of each anchoring section 142. Each void 144 is devoid of the material from which the edge restraint 130 is made. Fastener openings 152 extend through the anchoring sections 142. As illustrated in FIG. 2, each fastener opening 152 is circular or round to receive a correspondingly shaped nail spike 56. The fastener openings 152 can take an alternative configuration, such as rectangular, so as to receive a flat nail stake similar to the flat nail stake 58 depicted FIG. 1. As more clearly seen in FIG. 3, the horizontal section 132 defines a lower surface 162 of the edge restraint 130. The lower surface 162 of the edge restraint 130 is planar and rests on granular material such as the crushed limestone layer 18. The horizontal section 132 also includes an upper surface 164, which can be covered by backfill 122 (FIG. 4) when the installation is completed.

The vertical section 134 extends upwardly from and generally perpendicular to the horizontal section 132 to an upper edge 166 of the edge restraint 130. The upper edge 166 is positioned below an upper surface of the unit pavement system 10 when the edge restraint 130 is properly installed. As illustrated in FIGS. 2-4, the horizontal section 132 extends away from the vertical section 134 in a first (external) direction, which is away from the edge 22 of the unit pavement system 10. The vertical section 134 defines a paver-contacting surface 170 that contacts the edge 22 of the unit pavement system 10. The vertical section 134 also includes a backfill-contacting surface 172, which is opposite the paver-contacting surface 170. As illustrated in FIGS. 2-4, the edge restraint 130 is substantially L-shaped; however, the edge restraint can take other configurations, such as T-shaped.

In the embodiment depicted in FIGS. 2-4, the vertical section 134 of the edge restraint 130 includes a plurality of slots 176 that each can receive the plate-like stake 140 to operatively connect the plate-like stake with the edge restraint. Each slot 176 is located closer to the horizontal section 132 of the edge restraint 130 as compared to the upper edge 166 of the vertical section 134. As illustrated, each slot 176 is positioned adjacent to and slightly offset vertically above the corner 136 of the edge restraint 130. The plate-like stake 140 is sized and shaped to correspond to and be closely received within the slot 176. With reference to FIG. 2, each slot 176 is also aligned with a respective anchoring section 142 of the horizontal section 132. This allows the plate-like stake 140 to cover the head 60 of the nail spike 56, or other fastener (e.g., the flat nail stake 58 depicted in FIG. 1) when finally installed (see FIGS. 2 and 4).

With reference to FIG. 3, the plate-like stake 140 includes a first end 182 configured to be struck by a hammer and a second end 184 configured to be driven into coarse sand (e.g., the sand layer 16) or other granular material. The plate-like stake 140 is sufficiently rigid so as to be driven into the sand layer 16 disposed beneath the paver units 14 with a hammer. The plate-like stake 140 also includes a flat and thin (in the vertical direction) main body section 186. The main body section 186 is flexible enough so as to be bent below the finished grade 20 when driving the plate-like stake in a generally horizontal and internal direction underneath the paver units 14 and into the granular material layer, such as the sand layer 16, upon which the unit pavement system 10 is supported. When driving the plate-like stake 140 in the generally horizontal direction underneath the paver units 14, the main body section 186 is capable of bending along a central longitudinal axis 188 to form a curve as shown in FIG. 3. The plate-like stake 140 can be made from metal, plastic or another composite material capable of the functions described above.

As illustrated, the plate-like stake 140 includes a downwardly extending vertical section 192 that depends downwardly from the main body section 186 at the first end 182. An offset lower horizontal section 194 extends forwardly (toward the second end 184) from the vertical section 192 to form a hook-shaped flange at the first end 182. The offset lower horizontal section 194 is offset from and below the main body section 186 a sufficient distance so as to receive the horizontal section 132 of the edge restraint 130 as shown in FIG. 4. When the plate-like stake 140 is fully driven into its final position, which is shown in FIG. 4, the vertical section 192 engages the horizontal section 132 of the edge restraint 130 and the offset lower horizontal section 194 of the plate-like stake 140 is positioned beneath the horizontal section 132 and can contact the lower surface 162.

The plate-like stake 140 also includes a locking tab 200 disposed between the first end 182 and the second end 184. The locking tab 200 can be resilient to allow the locking tab 200 to pass through the slot 176 in the edge restraint 130. The locking tab 200 can be configured to engage the edge restraint 130 at the paver-contacting surface 170 after the main body section 186 has been sufficiently driven through the slot 176. The locking tab 200 can inhibit movement of the plate-like stake 140 outwardly away from the paver units 14. The locking tab 200 can be punched out of the main body section 186. The locking tab 200 extends vertically upward from a main body section 186 of the plate-like stake 140 and toward the first end 182. In an alternative arrangement, the locking tab 200 could extend downward from the main body section 186. The locking tab 200 can contact the paver-contacting surface 170 of vertical section 134 of the edge restraint 130 when the plate-like stake 140 is fully installed as shown in FIG. 4. When the plate-like stake 140 is fully installed, as shown in FIGS. 2 and 4, an external portion 202 of the plate-like stake 140 extends externally away from the backfill-contacting surface 172 and covers the nail stake 56. This allows the plate-like stake 140 to impede upward vertical movement of the nail stake 56. When the plate-like stake 140 is fully installed, a substantially horizontally disposed internal portion 204 of the plate-like stake 140 extends inwardly away from the paver-contacting surface 170 of the edge restraint 130. The internal portion 204 is part of the main body section 186 that is positioned underneath the paver units 14 in the granular material, which is the sand layer 16 in FIG. 4.

The edging system 112 can be installed by positioning the paver-contacting surface 170 of the edge restraint 130 against the edge 22 of the unit pavement system 10. When doing so, the lower surface 162 of the edge restraint 130 is positioned on granular material, such as the crushed limestone layer 18. The edge restraint 130 can be positioned such that the horizontal section 132 of the edge restraint 130 extends externally away from the edge 22 of the unit pavement system 10. This allows the paver-contacting surface 170 of the edge restraint 130 to be positioned against a finished edge of the paver units, such as the edge 22 shown in FIG. 2. This finished edge 22 can be formed by a cutting process such as the "rip cut" described above whereby the paver units 14 are overlaid past a finish line, and cut with a portable saw along the finish line to form the finished edge 22. Generally vertically-oriented fasteners, such as the nail spike 56 shown in FIGS. 2-4 or the flat nail spike 58 shown in FIG. 1, are driven into the granular material, such as the crushed limestone layer 18, or ground adjacent the granular material through the fastener openings 156 until the head 60 of the fastener contacts the horizontal section 132. The plate-like stake 140 is driven in a generally horizontal direction underneath at least one paver unit of the plurality of paver units 14 that make up the unit pavement system 10. The plate-like stake 140 can be driven into the granular material layer, such as sand layer 16, upon which the unit pavement system 10 is supported such that the plate-like stake is operatively connected with the edge restraint 130. As illustrated, the plate-like stake 140 is driven through the horizontal slot 176 formed in the vertical section 134 of the edge restraint 130. The plate-like stake 140 can be driven so as to cover the fastener 56 with the plate-like stake. As seen in FIG. 4, the plate-like stake 140 can be driven at least partially underneath an inner paver unit 14b, which is offset inwardly from a row of paver units 14a, along the edge 22 of the pavement system. As such, the main body section 186 of the plate-like stake 140 is driven internally deep enough underneath the plurality of pavers 14 so that an adequate amount of pressure can be applied by the paver units to resist vertical and horizontal movement of the plate-like stake.

A number of different variations of edging systems for unit pavement systems that include an edge restraint and a plate-like stake operatively connected with the edge restraint will now be described in more detail. Components and aspects of one embodiment can be employed in many different arrangements. A few further embodiments will be described below. However, the invention is not limited to only the embodiments described herein.

FIGS. 5A-5G depict alternative embodiments of plate-like stakes. FIG. 5A depicts a plate-like stake 140a having a first end 182a configured to be struck by a hammer and a second end 184a configured to be driven into a granular material such as coarse sand or aggregate. The plate-like stake 140a includes a flat and thin (in the vertical direction) main body section 186a. The main body section 186a is flexible enough to be bent below the finished grade surface so as to take a configuration similar to that shown in FIG. 3 where a longitudinal axis 188a of the plate-like stake 140a is curved. The plate-like stake also includes an upward flange 192a that extends upwardly from the main body section 186a. The upward flange 192a can be rolled over to further strengthen the flange. The plate-like stake 140a also includes a locking tab 200a that can be punched out of the main body section. The locking tab 200a can extend upwardly from the main body section nearer the first end 182a as compared to the second end 184a.

FIG. 5B depicts a plate-like stake 140b including a first end 182b configured to be struck by a hammer and a second end 184b configured to be driven into a granular material, such as coarse sand. The plate-like stake 140b includes a flat and thin (in the vertical direction) main body section 186b. The main body section 186b is flexible enough to be bent below the finished grade surface so as to take a configuration similar to that shown in FIG. 3 where a longitudinal axis 188b of the plate-like stake 140b is curved. The plate-like stake 140b further includes a downwardly extending vertical section 192b that extends downwardly from the main body section 186b at the first end 182b. An offset lower horizontal section 194b extends forwardly (toward the second end 184b) from the vertical section 192b. The offset lower horizontal section 194b is offset from the main body section 186b a sufficient distance so as to receive the horizontal section 132 of the edge restraint 130 shown in FIGS. 2-4. The plate-like stake 140a also includes a locking tab 200b that can be punched out of the main body section. The locking tab 200b can extend upwardly from the main body section nearer the first end 182b as compared to the second end 184b. The plate-like stake 140b also includes an elongate opening 206b that is dimensioned to receive the nail stake 56 shown in FIGS. 2-4 and/or the flat nail stake 58 shown in FIG. 1. To use the plate-like stake 140b with the edge restraint 130 depicted in FIGS. 2-4, the plate-like stake 140b is first inserted through the slot 176 and driven to a location similar to that shown for this plate-like stake 140 shown in FIGS. 2 and 4. This aligns the elongate opening 206b with the fastener openings 152. The nail stake 56 (or the flat nail stake 58 shown in FIG. 1) can then be driven through the elongate opening 206b and the fastener opening 152.

Figure 6:
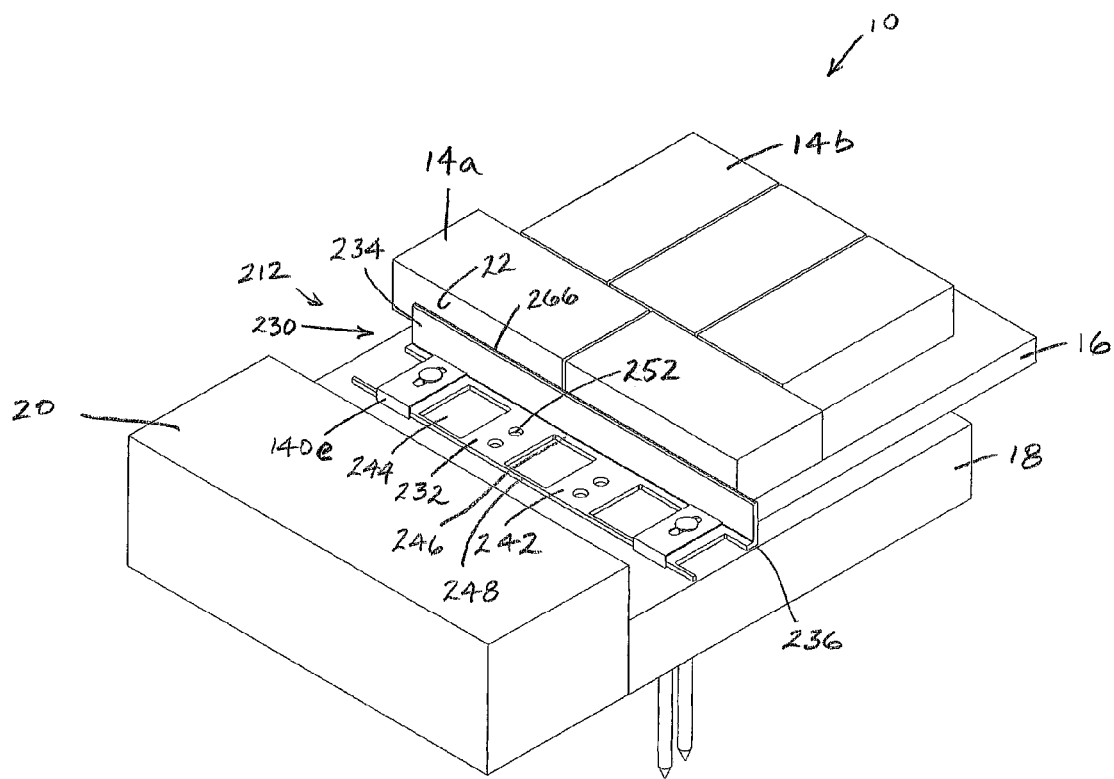
FIG. 6 is a perspective view of a unit pavement system and another edging system.
Figure 7:
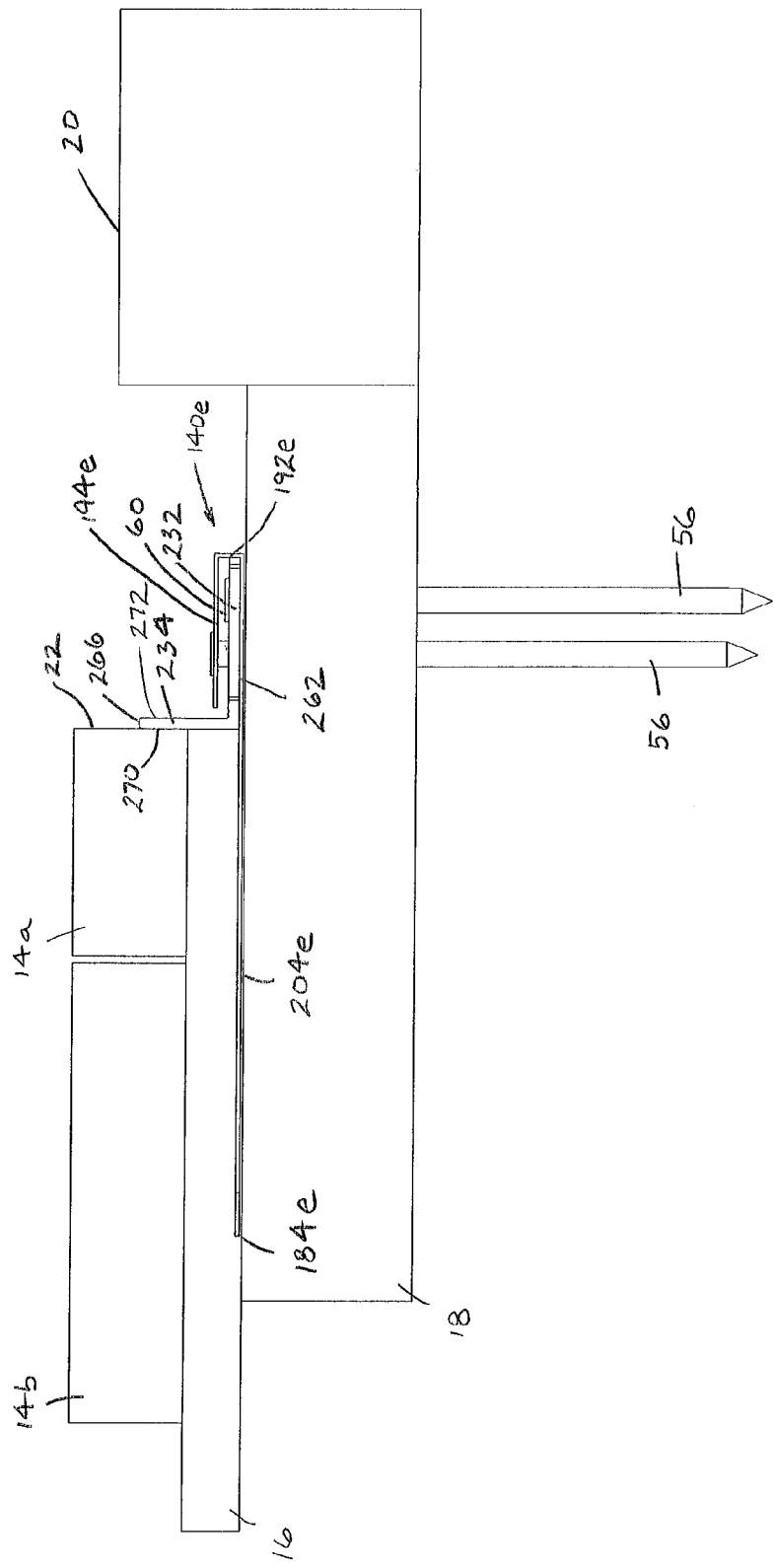
FIG. 7 is a cross-sectional view of the unit pavement system and the edging system of FIG. 6 with a plate-like stake driven into the granular material.

The plate-like stakes shown in FIG. 5C-5G can be used with embodiments described in further detail below. For example, FIGS. 6 and 7 depict an edging system 212 using a plate-like stake 140e shown in FIG. 5E. FIGS. 6 and 7 depict the unit pavement system 10 as shown in FIG. 1 and the edging system 212 to restrain the unit pavement system. The edging system 212 includes an edge restraint 230 including a horizontal section 232 and a vertical section 234 joined at a corner 236. The edging system 212 includes the plate-like stake 140e operatively connected with the edge restraint 230.

The edge restraint 230 is made from a rigid material, such as a rigid plastic, metal or composite material and is an elongate member having a length greater than a width and height. The horizontal section 232 of the edge restraint 230 includes a plurality of anchoring sections 242 separated by respective voids 244, a proximal web 246 and a distal web 248 similar to the edge restraint 130 described above. Fastener openings 252 extend through the anchoring sections 242. The fastener openings 252 can take an alternative configuration, such as rectangular. As more clearly seen in FIG. 7, the horizontal section 232 defines a lower surface 262 of the edge restraint 230. The horizontal section 232 also includes an upper surface 264.

The vertical section 234 extends upwardly from and generally perpendicular to the horizontal section 232 to an upper edge 266 of the edge restraint 230. The vertical section 234 defines a paver-contacting surface 270 that contacts the edge 22 of the unit pavement system 10. The vertical section 234 also includes a backfill-contacting surface 272, which is opposite the paver-contacting surface 270. The edge restraint 230 is substantially L-shaped.

With reference to FIG. 5E, the plate-like stake 140e includes a first end 182e configured to be struck by a hammer and a second end 184e configured to be driven into coarse sand (e.g., the sand layer 16 in FIG. 7) or other granular material. The plate-like stake 140e is sufficiently rigid so as to be driven into the sand layer 16 disposed beneath the paver units 14 with a hammer. The plate-like stake 140e also includes a flat and thin (in the vertical direction) main body section 186e. The main body section 186e is flexible enough so as to be bent below the finished grade 20 when driving the plate-like stake in a generally horizontal and internal direction underneath the paver units 14 and into the granular material layer, such as the sand layer 16, upon which the unit pavement system 10 is supported. When driving the plate-like stake 140e in the generally horizontal direction underneath the paver units 14, the main body section 186e is capable of bending along a central longitudinal axis 188e to form a curve similar to the plate-like stake 140 shown in FIG. 3. The plate-like stake 140e can be made from metal, plastic or another composite material capable of the functions described above.

The plate-like stake 140e includes an upwardly extending vertical section 192e that extends upwardly from the main body section 186e at the first end 182e. An offset upper horizontal section 194e extends forwardly (toward the second end 184e) from the vertical section 192e to form a hook-shaped flange at the first end 182e. The offset upper horizontal section 194e is offset from and above the main body section 186e a sufficient distance so as to receive the horizontal section 232 of the edge restraint 230 as shown in FIG. 7. When the plate-like stake 140e is fully driven into its final position, which is shown in FIG. 7, the vertical section 192e engages the horizontal section 232 of the edge restraint 230 and the offset upper horizontal section 194e of the plate-like stake 140e is positioned above and covers the horizontal section 232.

When the plate-like stake 140e is fully installed, as shown in FIG. 7, the offset upper horizontal section 194e of the plate-like stake 140e covers one of the nail stakes 56 (the right nail stake 56 shown in FIG. 7). This allows the plate-like stake 140e to impede upward vertical movement of this nail stake 56. When the plate-like stake 140e is fully installed as shown in FIG. 7, a substantially horizontally disposed internal portion 204e of the plate-like stake 140 extends inwardly away from the paver-contacting surface 270 of the edge restraint 230. This internal portion 204e is part of the main body section 186e that is positioned underneath the paver units 14 in the granular material, which is the sand layer 16 in FIG. 7.

The edging system 212 can be installed by positioning the paver-contacting surface 270 of the edge restraint 230 against the edge 22 of the unit pavement system 10. When doing so, the lower surface 262 of the edge restraint 230 is positioned on granular material, such as the crushed limestone layer 18. The edge restraint 230 can be positioned such that the horizontal section 232 of the edge restraint 230 extends externally away from the edge 22 of the unit pavement system 10. This allows the paver-contacting surface 270 of the edge restraint 230 to be positioned against a finished edge of the paver units, such as the edge 22 shown in FIG. 2. This finished edge 22 can be formed by a cutting process such as the "rip cut" described above. Generally vertically-oriented fasteners, such as the right nail spike 56 shown in FIG. 7 (or the flat nail spike 58 shown in FIG. 1) are driven into the granular material, such as the crushed limestone layer 18, or ground adjacent the granular material through the fastener openings 256 until the head 60 of the fastener contacts the horizontal section 232.

The plate-like stake 140e is driven in a generally horizontal direction underneath at least one paver unit of the plurality of paver units 14 that make up the unit pavement system 10. The plate-like stake 140e can be driven into the granular material layer, such as sand layer 16, upon which the unit pavement system 10 is supported such that the plate-like stake is operatively connected with the edge restraint 230. As illustrated, the plate-like stake 140e is driven underneath the horizontal section 232 of the edge restraint 130. The plate-like stake 140e includes an elongate slot 208e (FIG. 5E) extending from the second end 184e toward the first end 182e through the main body section 186e. The elongate slot 208e is centered along the longitudinal axis 188e. The plate-like stake 140e is driven with the right fastener 56 shown in FIG. 7 received in the elongate slot 208e. As seen in FIG. 7, the plate-like stake 140e can be driven at least partially underneath an inner paver unit 14b, which is offset inwardly from a row of paver units 14a, along the edge 22 of the pavement system. The offset upper horizontal section 194e of the plate-like stake 140e also includes the elongate opening 206e. The plate-like stake 140e is first driven underneath the horizontal section 262 of the edge restraint 230 to the location shown in FIG. 7. This aligns the elongate opening 206e with one of the inner fastener openings 252 (closer to the vertical section 234). The left nail stake 56 shown in FIG. 7 (or the flat nail stake 58 shown in FIG. 1) can then be driven through the elongate opening 206e, the fastener opening 252 and the elongate slot 208e.

FIGS. 5C, 5D and 5F depict other plate-like stakes 140c, 140d and 140f, respectively, that are configured to operatively connect with an edge restraint, such as the edge restraint 230 depicted in FIGS. 6 and 7, by being driven underneath the horizontal section 232.

FIG. 5C depicts the plate-like stake 140c includes a first end 182c configured to be struck by a hammer and a second end 184c configured to be driven into coarse sand (e.g., the sand layer 16 in FIG. 7) or other granular material. The plate-like stake 140c is sufficiently rigid so as to be driven into the sand layer 16 disposed beneath the paver units 14 with a hammer. The plate-like stake 140c also includes a flat and thin (in the vertical direction) main body section 186c. The main body section 186c is flexible enough so as to be bent below the finished grade 20 when driving the plate-like stake in a generally horizontal and internal direction underneath the paver units 14 and into the granular material layer, such as the sand layer 16, upon which the unit pavement system 10 is supported. When driving the plate-like stake 140c in the generally horizontal direction underneath the paver units 14, the main body section 186c is capable of bending along a central longitudinal axis 188c to form a curve similar to the plate-like stake 140 shown in FIG. 3. The plate-like stake 140c can be made from metal, plastic or another composite material capable of the functions described above.

The plate-like stake 140c includes an upwardly extending vertical section 192c that extends upwardly from the main body section 186c at the first end 182c. An offset upper horizontal section 194c extends forwardly (toward the second end 184c) from the vertical section 192c to form a hook-shaped flange at the first end 182c. The offset upper horizontal section 194c is offset from and above the main body section 186c a sufficient distance so as to receive the horizontal section 232 of the edge restraint 230 shown in FIG. 7. When the plate-like stake 140c is fully driven into its final position, similar to the position shown in FIG. 7, the vertical section 192c engages the horizontal section 232 of the edge restraint 230 and the offset upper horizontal section 194c of the plate-like stake 140c is positioned above and covers the horizontal section 232.

The plate-like stake 140c can be driven underneath the horizontal section 232 of the edge restraint 130. The plate-like stake 140c includes an elongate slot 208c extending from the second end 184c toward the first end 182c through the main body section 186c. The elongate slot 208c is centered along the longitudinal axis 188c. The plate-like stake 140c is driven so as to receive and to cover the right fastener 56 shown in FIG. 7. The plate-like stake 140c can be driven at least partially underneath an inner paver unit 14b, which is offset inwardly from a row of paver units 14a, along the edge 22 of the pavement system. The plate-like stake 140c is driven underneath the horizontal section 262 of the edge restraint 230 to the location shown in FIG. 7 after insertion of the right nail stake 56 shown in FIG. 7. The left nail stake 56 shown in FIG. 7 would not be used with this plate-like stake 140c.

A plate-like stake similar to plate-like stake 140c but without the elongate slot (i.e., the main body section 186c would be similar to the main body section 186b) could also be used similar to the plate-like stake 140c. Such a stake would operatively connect with the edge restraint 130 by engaging the horizontal section 132, however, the plate-like stake would be laterally offset from the nail spikes 56.

FIG. 5D depicts the plate-like stake 140d includes a first end 182d configured to be struck by a hammer and a second end 184d configured to be driven into coarse sand or other granular material. The plate-like stake 140d is sufficiently rigid so as to be driven into the sand layer 16 disposed beneath the paver units 14 with a hammer. The plate-like stake 140*d* also includes a flat and thin (in the vertical direction) main body section 186*d*. The main body section 186*d* is flexible enough so as to be bent below the finished grade 20 when driving the plate-like stake in a generally horizontal and internal direction underneath the paver units 14 and into the granular material layer, such as the sand layer 16, upon which the unit pavement system 10 is supported. The plate-like stake 140*d* can be made from metal, plastic or another composite material capable of the functions described above.

The plate-like stake 140*d* includes an upwardly extending vertical section 192*d* that extends upwardly from the main body section 186*d* at the first end 182*d*. An offset upper horizontal section 194*d* extends forwardly (toward the second end 184*d*) from the vertical section 192*d* to form a hook-shaped flange at the first end 182*d*. The offset upper horizontal section 194*d* is offset from and above the main body section 186*d* a sufficient distance so as to receive the horizontal section 232 of the edge restraint 230 shown in FIG. 7.

The plate-like stake 140*c* can be driven underneath the horizontal section 232 of the edge restraint 130. The offset upper horizontal section 194*d* of the plate-like stake 140*d* also includes an elongate opening 206*d* aligned with an elongate hole 208*d* in the main body section 186*d*. The plate-like stake 140*d* is driven underneath the horizontal section 262 of the edge restraint 230 to the location shown in FIG. 7 prior to driving the nail stake 56 shown in FIG. 7. One of the nail stakes 56 shown in FIG. 7 can then be driven through the elongate opening 206*d* in the offset upper horizontal section 194*d*, the fastener opening 256 in the horizontal section 232 of the edge restraint 230 and the elongate hole 208*d* in the main body section 186*d*. A tab 200*d* similar to the tabs described above can also extend upwardly from the main body section 186*d*.

FIG. 5F depicts a plate-like stake 140*f* that is the same in configuration as the plate-like stake 140*e* described above, except the elongate opening 206*f* is rectangular (so as to accommodate the flat nail stake 58 shown in FIG. 1). The plate-like stake 140*f* operates in the same manner as the plate-like stake 140*e* described above.

FIG. 5G depicts a plate-like stake 140*g* having a first end 182*g* configured to be struck by a hammer and a second end 184*g* configured to be driven into a granular material. The plate-like stake 140*g* includes a flat and thin (in the vertical direction) main body section 186*g*. The main body section 186*g* is flexible similar to the plate-like stakes described above. The plate-like stake 186*g* also includes a flange 192*g* that extends upwardly from the main body section 186*g* at the first end 182*g*. The flange 192*g* can be rolled over to further strengthen the flange. The plate-like stake 140*g*, and more particularly the main body section 186*g* thereof, defines a longitudinal central axis 188*g*. The flange 192*g* is angled at an angle other than perpendicular with respect to the longitudinal central axis 188*g*. The plate-like stake 140*g* also includes a locking tab 200*g* similar to the locking tabs described above.

Figure 8:
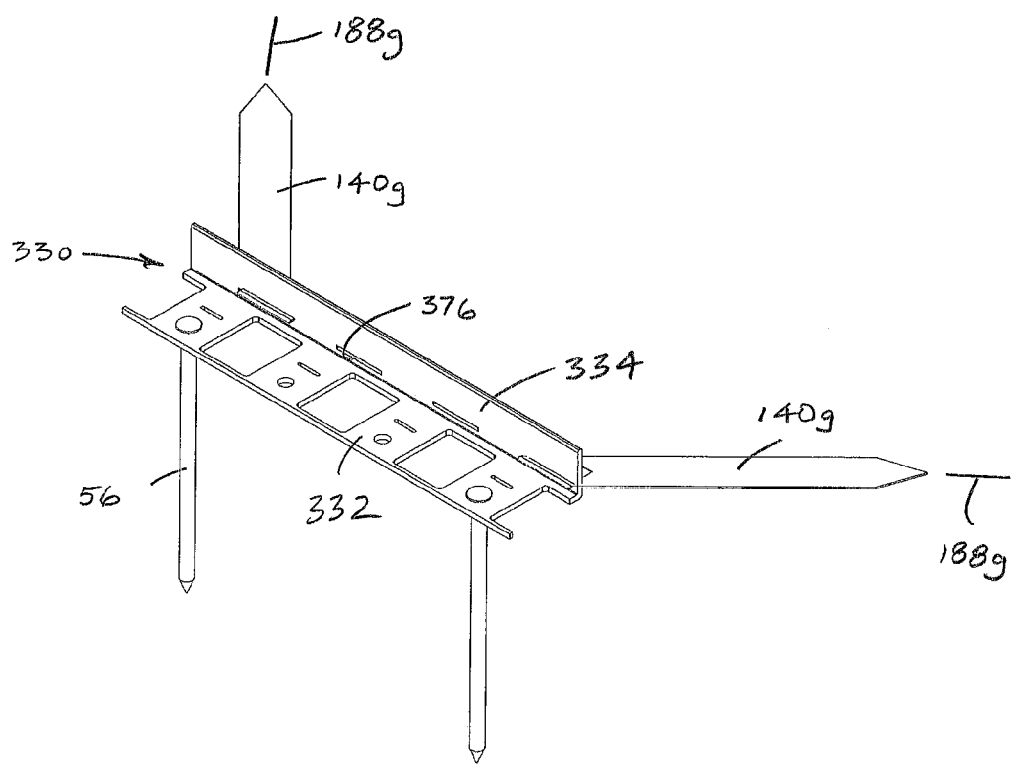
FIG. 8 is a perspective view of another edging system.

FIG. 8 depicts an edge restraint 330 similar in configuration to the edge restraint 30 described in FIG. 1 except for the addition of a plurality of slots 376 similar to the slots 76 in the edge restraint 30 shown in FIG. 2. In FIG. 8, the central axis 188*g* of each plate-like stake 140*g* is offset from the vertical section 334 of the edge restraint 330 at an angle other than 90 degrees as measured in a plane parallel to the horizontal section 332 of the edge restraint.

Figure 9:
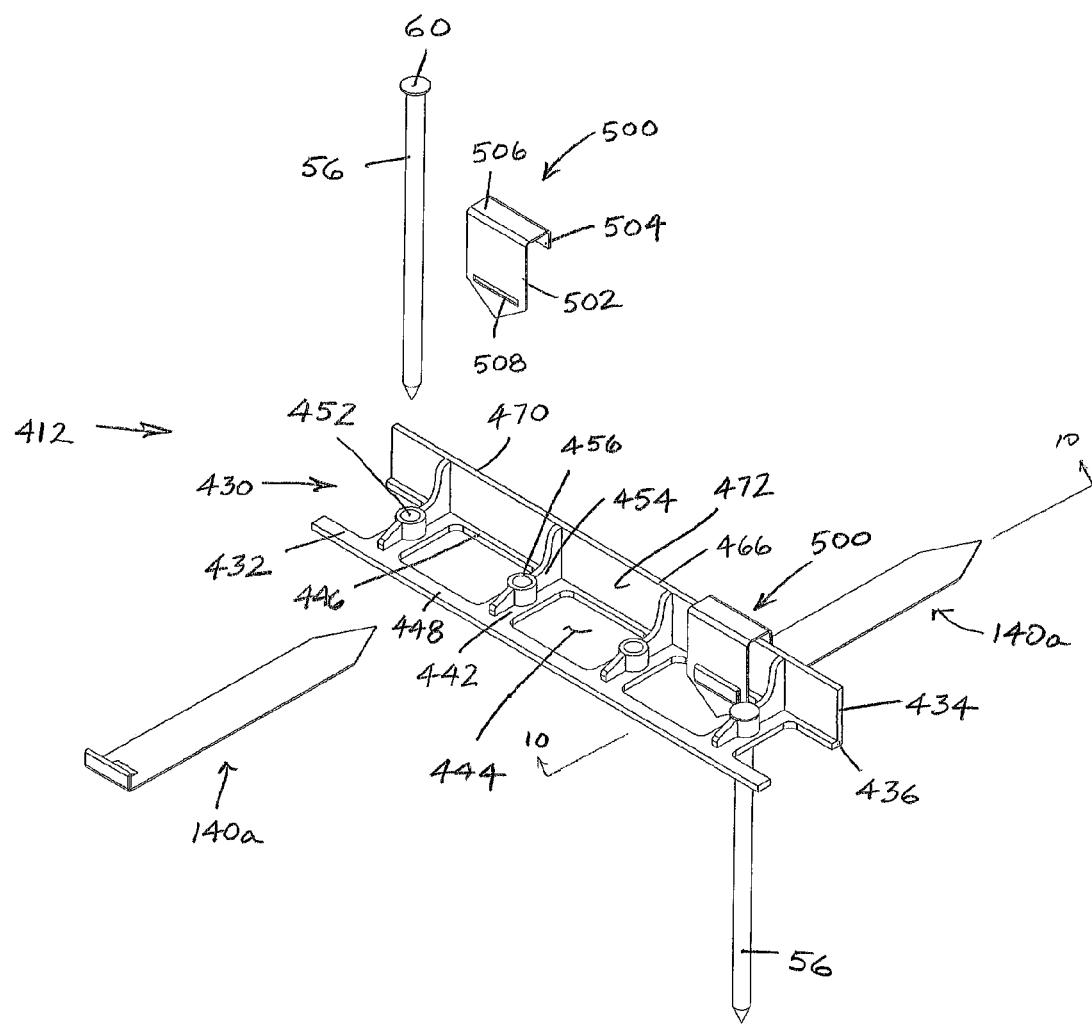
FIG. 9 is a perspective view of another edging system having a clip.
Figure 10:
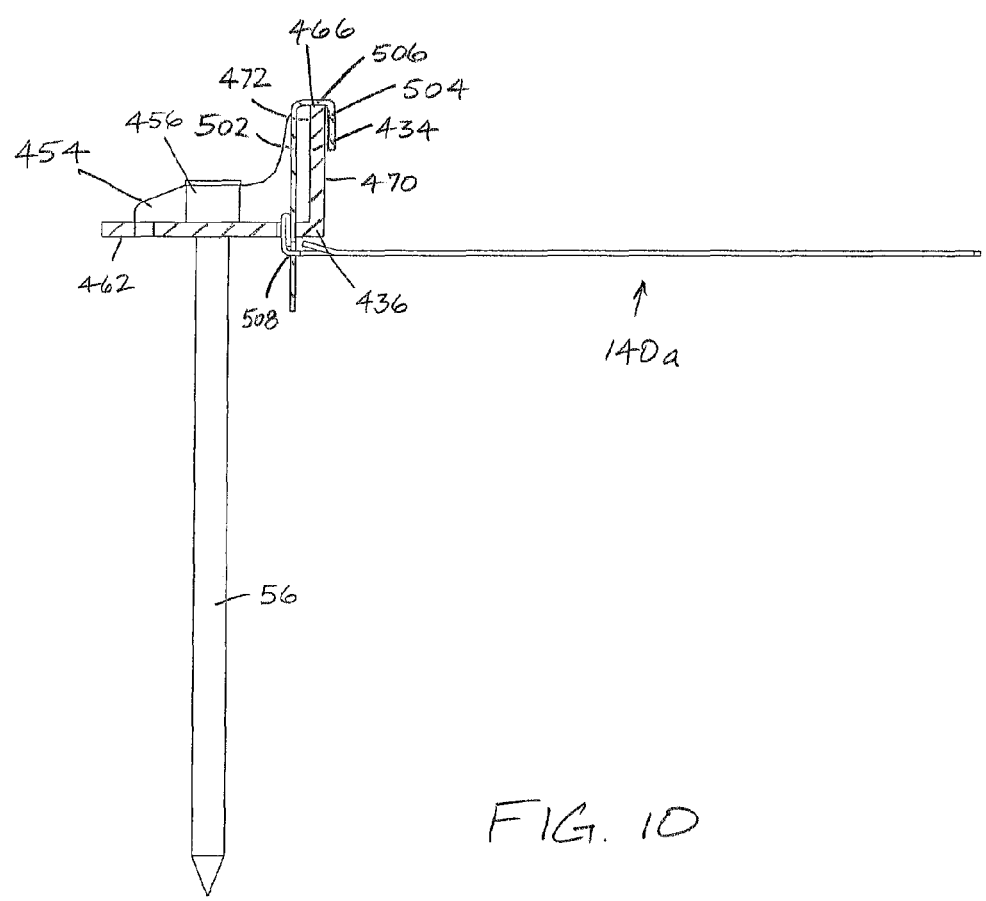
FIG. 10 is a cross-sectional view of the edging system of FIG. 9 taken along line 10-10 of FIG. 9.

FIGS. 9 and 10 depict an edging system 412 to restrain a unit pavement system (not shown, but similar to the unit pavement system 10 described above). The edging system 412 includes an edge restraint 430 including a horizontal section 432 and a vertical section 434 joined at a corner 436. The edging system 412 employs the plate-like stake 140*a* shown also in FIG. 5A operatively connected with the edge restraint 430. The edge restraint 430 depicted in FIGS. 9 and 10 is made from a rigid plastic material.

The horizontal section 432 of the edge restraint 430 includes a plurality of anchoring sections 442 separated by respective voids 444. The horizontal section 432 also includes a proximal web 446 disposed adjacent the vertical section 434 and a distal web 448 spaced from the vertical section 434. Each void 444 is bounded by two adjacent anchoring sections 442, a respective proximal web 446 and a respective distal web 448. Each void 444 is devoid of the material from which the edge restraint 430 is made.

Fastener openings 452 extend through the anchoring sections 442. As illustrated in FIG. 9, buttresses 454 extend upwardly from each anchoring section 442 connecting the respective anchoring section to the vertical section 434. Bosses 456 also extend upwardly from each anchoring section 442 and define the fastener openings 452. Each fastener opening 452 is circular or round to receive a correspondingly shaped nail spike 56. The fastener openings 452 can take an alternative configuration, such as rectangular, so as to receive a flat nail stake similar to the flat nail stake 58 depicted FIG. 1. As more clearly seen in FIG. 10, the horizontal section 432 defines a lower surface 462 of the edge restraint 430. The lower surface 462 of the edge restraint 430 is planar and rests on granular material such as the crushed limestone layer 18 (see FIG. 2).

The vertical section 434 extends upwardly from and generally perpendicular to the horizontal section 432 to an upper edge 466 of the edge restraint 430. The upper edge 466 is positioned below an upper surface of the unit pavement system (not shown in FIGS. 9 and 10) when the edge restraint 430 is properly installed. As illustrated in FIGS. 9 and 10, the horizontal section 432 extends away from the vertical section 434 in a first (external) direction, which is away from the edge of the unit pavement system (not shown in FIGS. 9 and 10). The vertical section 434 defines a paver-contacting surface 470. The vertical section 434 also includes a backfill-contacting surface 472, which is opposite the paver-contacting surface 470.

In the embodiment depicted in FIGS. 9 and 10, the edging system 412 includes a clip 500 to operatively connect the plate-like stake 140*a* with the edge restraint 430. The clip 500 includes a main vertical section 502, a second vertical section 504 spaced from the main vertical section, a cap section 506 connecting the main vertical section to the second vertical section, and a slot 508 in the main vertical section that receives the plate-like stake 140*a*. The cap section 506 contacts the vertical section 434, and more particularly the upper edge 466, of the edge restraint 430 and the slot 508 is positioned adjacent to and below the corner 436 of the edge restraint 430 when fully installed (see FIG. 10). The slot 508 is sized and shaped to correspond to and closely receive the plate-like stake 140*a*. The plate-like stake 140*a* is also sized and shaped to correspond to and be closely received within the slot 508. With reference to FIG. 9, each clip 500 is sized to be received in a respective void 444 of the horizontal section 432 of the edge restraint 430. As such, the clip 500 can be used with other edge restraints that include similarly shaped voids. Alternatively, the orientation of the clip 500 with respect to the edge restraint 430 could be changed where the main vertical section 502 is adjacent to the paver-contacting surface 470 (i.e., the clip is rotated 180 degrees about a central vertical axis).

The edging system 412 can be installed by positioning the paver-contacting surface 470 of the edge restraint 430 against the edge of the unit pavement system (not shown in FIGS. 9 and 10). The edge restraint 430 can be positioned such that the horizontal section 432 of the edge restraint 430 extends externally away from the edge of the unit pavement system. This allows the paver-contacting surface 470 of the edge restraint 430 to be positioned against a finished edge of the paver units, such as the edge 22 shown in FIG. 2. This finished edge 22 can be formed by a cutting process such as the "rip cut" described above. Fasteners, such as the nail spike 56 shown in FIGS. 9 and 10 or the flat nail spike 58 shown in FIG. 1, are driven into the granular material or ground adjacent the granular material through the fastener openings 456 until the head 60 of the fastener contacts the boss 456. The plate-like stake 140a is driven in a generally horizontal direction underneath at least one paver unit of the plurality of paver units that make up the unit pavement system. As illustrated, the plate-like stake 140a is driven through the horizontal slot 508 formed in the main vertical section 502 of the clip 500 after the clip 500 has been driven into the granular material through the void 444 in the horizontal section 442. As seen in FIG. 10, the plate-like stake 140a can be driven underneath the vertical section 434 of the edge restraint. The main body section 186a of the plate-like stake 140a is driven internally deep enough underneath the plurality of pavers so that an adequate amount of pressure can be applied by the paver units to resist vertical and horizontal movement of the plate-like stake.

Clips having other shapes are shown in FIGS. 11A-11D. FIG. 11A depicts a clip 500a including a main vertical section 502a, a second vertical section 504a spaced from the main vertical section, a cap section 506a connecting the main vertical section to the second vertical section, and a slot 508a in the main vertical section that receives a plate-like stake, such as the plate-like stake 140a. The clip 500a further includes a horizontal section 512a that extends in a direction away (internally) from a lower end of the second vertical section 504a. The horizontal section 512a is positioned above the slot 508a.

FIG. 11B depicts a clip 500b including a main vertical section 502b, a second vertical section 504b spaced from the main vertical section, a cap section 506b connecting the main vertical section to the second vertical section, and a slot 508b in the main vertical section. The second vertical section 504b extends downwardly from the cap 506b the same distance as the main vertical section 502b and includes a slot 514b aligned with the slot 508b. Each slot 508b, 514b is sized and shaped to correspond to and closely receive a plate-like stake such as the plate-like stake 140a.

FIG. 11C depicts a clip 500c including a main vertical section 502c, a second vertical section 504c spaced from the main vertical section, a cap section 506c connecting the main vertical section to the second vertical section, and a slot 508c in the main vertical section. The clip 500c further includes an additional main vertical section 522c, an additional second vertical section 524c spaced from the additional main vertical section, an additional cap section 526c connecting the additional main vertical section to the additional second vertical section, and an additional slot 528c in the additional main vertical section. Each slot 508c, 528c is sized and shaped to correspond to and closely receive a plate-like stake such as the plate-like stake 140a. The main vertical section 502c is disposed at a 90 degree angle with respect to the additional main vertical section 522c in the illustrated embodiment, however, other angular relationships are available.

FIG. 11D depicts a clip 500d very similar in configuration to the clip 500c, however, a single slot 508d extends through both the main vertical section 502d and the additional main vertical section 522d.

Figure 12:
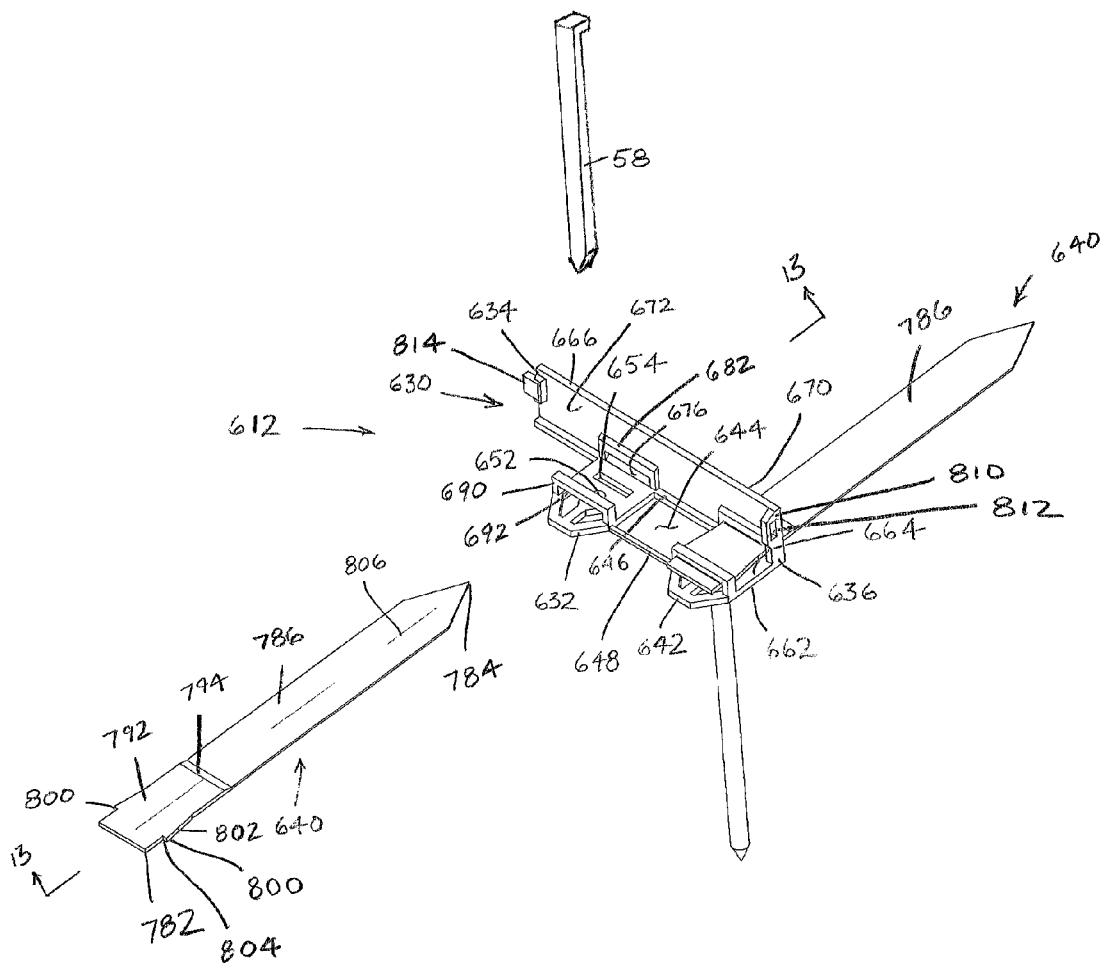
FIG. 12 is a perspective view of another edging system.
Figure 13:
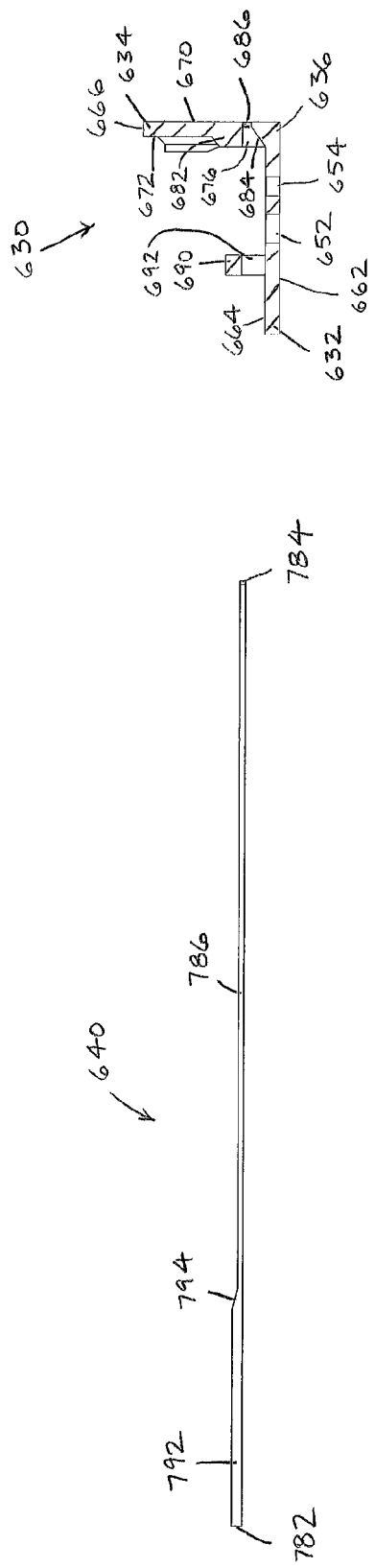
FIG. 13 is a cross-sectional view of the edging system of FIG. 12 taken along line 13-13 of FIG. 12.

FIGS. 12 and 13 another edging system 612 to restrain a unit pavement system. The edging system 612 includes an edge restraint 630 including a horizontal section 632 and a vertical section 634 joined at a corner 636. The edging system 612 includes a plate-like stake 640 operatively connected with the edge restraint 630. The edge restraint 630 is made from a rigid plastic material, but could also be made from metal or composite material. The edge restraint 630 is an elongate integrally formed member having a length greater than a width and height (the edge restraint can be much longer than that shown in FIG. 12).

The horizontal section 632 of the edge restraint 630 includes a plurality of anchoring sections 642 separated by respective voids 644. The horizontal section 632 also includes a proximal web 646 disposed adjacent the vertical section 634 and a distal web 648 spaced from the vertical section 634. Each void 644 is bounded by two adjacent anchoring sections 642, a respective proximal web 646 and a respective distal web 648. The area of each void 644 is greater than the area of each anchoring section 642. Each void 644 is devoid of the material from which the edge restraint 630 is made.

Fastener openings, such as a round (circular) fastener opening 652 and a rectangular fastener opening 654, extend through each anchoring section 642. Fasteners, such as a nail spike 56 and a flat nail stake 58 (see FIG. 1), can be received in the respective openings 652, 654. The nail spike 56 is driven through the round fastener opening 652 until a head 660 of the nail spike 56 contacts the horizontal section 632. The flat nail stake 58 (see FIG. 1) is particularly useful when the edging system 612 is used to retain permeable pavement. As more clearly seen in FIG. 13, the horizontal section 632 defines a lower surface 662 of the edge restraint 630. The lower surface 662 of the edge restraint 630 is planar and rests on granular material when installed. The horizontal section 632 also includes an upper surface 664, which can be covered by backfill 122 (see FIG. 4) when the installation is completed.

The vertical section 634 extends upwardly from and generally perpendicular to the horizontal section 632 to an upper edge 666 of the edge restraint 630. The upper edge 666 is positioned below an upper surface of the unit pavement system when the edge restraint 630 is properly installed. The horizontal section 632 extends away from the vertical section 634 in a first (external) direction, which is away from the edge of the unit pavement system, when the edge restraint is installed. The vertical section 634 defines a paver-contacting surface 670 that contacts the edge of the unit pavement system. The vertical section 634 also includes a backfill-contacting surface 672, which is opposite the paver-contacting surface 670. The edge restraint 630 is substantially L-shaped; however, the edge restraint can take other configurations.

The vertical section 634 of the edge restraint 630 includes a plurality of slots 676 that each can receive the plate-like stake 640 to operatively connect the plate-like stake with the edge restraint. Each slot 676 is located closer to the horizontal section 632 of the edge restraint 630 as compared to the upper edge 666 of the vertical section 634. As illustrated, each slot 676 is positioned adjacent to and slightly offset vertically above the corner 636 of the edge restraint 630. The plate-like stake 640 is sized and shaped to correspond to and be closely received within the slot 676. Each slot 676 is also aligned with a respective anchoring section 642, which allows the plate-like stake 640 to cover the head 60 of the nail spike 56, or other fastener (e.g., the flat nail stake 58 depicted in FIG. 1) when finally installed.

The vertical section 634 of the edge restraint 630 includes a thickened frame section 682 that surrounds at least three sides of each respective horizontal slot 676. Each thickened frame section 682 provides structural rigidity to the vertical section 634 near each slot 676. As seen in FIG. 13, a ramp 684 is provided in each slot 676. The ramp 684 slopes upwardly from the backfill-contacting surface 672 toward the paver-contacting surface 670. A knockout section 686 can be provided in each slot 676. The knockout section 686 is configured to be punched out when the plate-like stake 640 is driven through the slot 676. In an installation where a respective slot 676 does not receive a plate-like stake 640, the knockout section, which will remain, can preclude the migration of granular material to the back side of the edge restraint 630.

The edge restraint 630 includes a frame 690 extending from the horizontal section 632 at each anchoring section 642. The frame 690 is spaced from the vertical section 634 in the first (external) direction. The frame 690 defines an additional slot 692 that receives the plate-like stake 640 when the plate-like stake is driven through the slots 676, 692 and into the granular material.

The plate-like stake 640 includes a first end 782 configured to be struck by a hammer and a second end 784 configured to be driven into coarse sand or other granular material. The plate-like stake 640 is sufficiently rigid so as to be driven into the sand layer disposed beneath the paver units with a hammer. The plate-like stake 640 also includes a flat and thin (in the vertical direction) main body section 786. The main body section 786 is flexible enough so as to be bent below the finished grade when driving the plate-like stake in a generally horizontal (similar to the embodiment shown in FIG. 3).

The plate-like stake 640 includes a thickened section 792 adjacent the first end 782. A ramp 794 provides a transition from the main body section 786 to the thickened section 792. The plate-like stake 640 also includes a locking tab 800 (two are shown in FIG. 12) disposed between the first end 182 and the second end 184. The frame 690 can be resilient to allow the locking tabs 800 to pass through the additional slot 692 in the frame. The locking tabs 800 are configured to engage the edge restraint 630 at the frame 690 after the main body section 786 has been sufficiently driven through the slot 676 in the vertical section 634. The locking tabs 800 can inhibit movement of the plate-like stake 640 outwardly away from the paver units. The locking tabs 800 extend horizontally outward from the main body section 786 of the plate-like stake 640 and each include a ramped edge 802 that is tapered toward the second end 784. Each locking tab 800 is somewhat barb-shaped and includes a shelf 804 at the rear end of each ramped edge 802. The shelf 804 is perpendicular to the longitudinal axis 806 of the plate-like stake. The locking tab 800, and more particularly each shelf 804, contacts the frame 690 on the horizontal section 632 of the edge restraint 630 when the plate-like stake 640 is fully installed. When the plate-like stake 640 is fully installed, the thickened section 792 of the plate-like stake 640 extends externally away from the backfill-contacting surface 672 and covers the nail stake 56. This allows the plate-like stake 640 to impede upward vertical movement of the nail stake 56. When the plate-like stake 640 is fully installed, the main body section 786 of the plate-like stake 640 extends inwardly away from the paver-contacting surface 670 of the edge restraint 630. The main body section 786 is positioned underneath the paver units in the granular material so as to be retained by the weight of the paver units.

The plate-like stake 640 can be made from metal, plastic or another composite material capable of the functions described above.

The edge restraint 630 also includes a vertical end wall 810 having an opening 812. A tab 814 extends from an opposite end of the edge restraint 630. The tab 814 of one edge restraint is received in the opening 812 to connect two edge restraints. Otherwise, the edging system 612 can be installed similarly to the edging system 112 described above.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of installing an edging system for a unit pavement system, the method comprising:
positioning a paver-contacting surface of an edge restraint against an edge of a unit pavement system including a plurality of paver units, wherein the edge restraint includes a horizontal section and a vertical section joined at a corner, the horizontal section includes a fastener opening, and the vertical section defining the paver-contacting surface and extending upwardly from and generally perpendicular to the horizontal section;
driving a vertically thin main body section of a stake in a generally horizontal direction underneath at least one paver unit of the plurality of paver units and into a granular material layer upon which the unit pavement system is supported such that the stake is operatively connected with the edge restraint; and
driving a generally vertically oriented fastener into the granular material or ground adjacent the granular material through the fastener opening until a head of the fastener contacts the horizontal section, and driving the vertically thin main body section of the stake further includes driving the vertically thin main body section of the stake to cover the fastener with the stake.

2. The method of claim 1, wherein positioning the edge restraint further includes positioning the horizontal section of the edge restraint so as to extend away from the edge of the unit pavement system, and positioning the paver-contacting surface of the edge restraint against a finished edge of the paver units, which is formed by a cutting process whereby the paver units are overlaid past a finish line, and cut with a portable saw along the finish line to form the finished edge.

3. The method of claim 1, wherein driving the vertically thin main body section of the stake further includes driving the vertically thin main body section of the stake at least partially underneath an inner paver unit, which is offset inwardly a row from the paver units along the edge of the unit pavement system.

4. The method of claim 1, wherein driving the vertically thin main body section of the stake further includes driving the vertically thin main body section of the stake through a slot formed in the vertical section of the edge restraint.

5. A method of installing an edging system for a unit pavement system, the method comprising:
positioning a paver-contacting surface of an edge restraint against an edge of a unit pavement system including a plurality of paver units, wherein the edge restraint includes a horizontal section and a vertical section joined at a corner, the horizontal section including a fastener opening, the vertical section defining the paver-contacting surface and extending upwardly from and generally perpendicular to the horizontal section;

driving a vertically thin stake in a generally horizontal direction underneath at least one paver unit of the plurality of paver units and into a granular material layer upon which the unit pavement system is supported such that the vertically thin stake is operatively connected with the edge restraint; and driving a generally vertically oriented fastener into the granular material or ground adjacent the granular material through the fastener opening, and driving the vertically thin stake further includes driving the vertically thin stake after the fastener has been driven through the fastener opening with the fastener received in an elongate slot formed in the vertically thin stake.

6. A method of installing an edging system for a unit pavement system, the method comprising:

positioning a paver-contacting surface of an edge restraint against an edge of a unit pavement system including a plurality of paver units, wherein the edge restraint includes a horizontal section and a vertical section joined at a corner, the horizontal section including a fastener opening, the vertical section defining the paver-contacting surface and extending upwardly from and generally perpendicular to the horizontal section;

driving a stake, which includes a fastener hole, in a generally horizontal direction underneath at least one paver unit of the plurality of paver units and into a granular material layer upon which the unit pavement system is supported such that the stake is operatively connected with the edge restraint and the fastener opening is vertically aligned with the fastener hole; and driving a generally vertically oriented fastener into the granular material or ground adjacent the granular material through the fastener opening and the fastener hole.

7. An edging system for a unit pavement system comprising:

an edge restraint including a horizontal section and a vertical section joined at a corner, the vertical section extending upwardly from and generally perpendicular to the horizontal section to an upper edge, the vertical section also defining a paver-contacting surface configured to contact an edge of the unit pavement system, wherein the vertical section includes a slot located closer to the horizontal section of the edge restraint as compared to the upper edge; and a stake configured to operatively connect with the edge restraint and to be received within the slot adjacent to and slightly offset from the corner of the edge restraint such that a substantially horizontally disposed main body section of the stake extends away from the paver-contacting surface, wherein the stake is sufficiently rigid so as to be driven into coarse sand or aggregate with a hammer underneath paver units of the unit pavement system wherein the stake includes a first end configured to be struck by the hammer, a second end configured to be driven into the coarse sand or aggregate, and a locking tab disposed between the first end and the second end, wherein the locking tab is configured to engage the edge restraint to inhibit movement of the stake with respect to the edge restraint.

8. The edging system of claim 7, wherein the edge restraint is substantially L-shaped.

9. The edging system of claim 7, wherein the main body section of the stake is sized and shaped to correspond to and be closely received within the slot.

10. The edging system of claim 7, wherein the locking tab extends vertically upward or downward from the main body section of the stake.

11. The edging system of claim 7, wherein the edge restraint includes a frame extending from the horizontal section spaced from the vertical section in a first direction, wherein the frame defines an additional slot that receives the stake and the locking tab contacts the frame.

12. The edging system of claim 7, wherein the horizontal section includes a plurality of anchoring sections separated by respective voids and the vertical section includes a plurality of slots that are each aligned with a respective anchoring section.

13. The edging system of claim 7, further comprising a knockout section provided in the slot, wherein the knockout section is configured to be punched out when the stake is driven through the slot.

14. An edging system for a unit pavement system comprising:

an edge restraint including a horizontal section and a vertical section joined at a corner, the vertical section extending upwardly from and generally perpendicular to the horizontal section and defining a paver-contacting surface configured to contact an edge of the unit pavement system;

a stake operatively connected with the edge restraint adjacent to and slightly offset from the corner of the edge restraint, wherein the stake is sufficiently rigid so as to be driven into coarse sand or aggregate with a hammer underneath paver units of the unit pavement system, wherein the stake includes a substantially horizontally disposed main body section extending away from the paver-contacting surface of the edge restraint; and a clip including a main vertical section, a second vertical section spaced from the main vertical section, a cap section connecting the main vertical section to the second vertical section, and a slot in the main vertical section that receives the stake, wherein the cap section contacts the vertical section of the edge restraint and the slot is positioned adjacent to and below the corner, wherein the slot is sized and shaped to receive the stake.

15. The edging system of claim 14, wherein the stake includes a first end configured to be struck by a hammer, a second end configured to be driven into coarse sand or aggregate, and a locking tab disposed between the first end and the second end, wherein the locking tab is configured to engage the clip to inhibit movement of the stake with respect to the edge restraint.

16. An edging system for a unit pavement system comprising:

an edge restraint including a horizontal section and a vertical section joined at a corner, the vertical section extending upwardly from and generally perpendicular to the horizontal section and defining a paver-contacting surface configured to contact an edge of the unit pavement system, the horizontal section including a nail stake opening;

a stake operatively connected with the edge restraint adjacent to and slightly offset from the corner of the edge restraint, wherein the stake is sufficiently rigid so as to be driven into coarse sand or aggregate with a hammer underneath paver units of the unit pavement system, wherein the stake includes a substantially horizontally disposed main body portion extending away from the paver-contacting surface of the edge restraint, wherein the stake includes an elongate slot; and a generally vertically oriented nail stake received receivable through the nail stake opening and the elongate slot.

17. A method of installing an edging system for a unit pavement system, the method comprising:

positioning a paver-contacting surface of an edge restraint against an edge of a unit pavement system including a plurality of paver units, wherein the edge restraint includes a horizontal section and a vertical section, the vertical section defining the paver-contacting surface and extending upwardly from and generally perpendicular to the horizontal section to an upper edge; and driving a main body section of a stake having a locking tab in a generally horizontal direction through a slot in the vertical section of the edge restraint until the locking tab engages the edge restraint, which inhibits movement of the stake with respect to the edge restraint, wherein the slot is located closer to the horizontal section of the edge restraint as compared to the upper edge of the vertical section.

18. The method of claim 17, further comprising bending the stake so as to curve the stake upward with the stake received in the slot in the vertical section of the edge restraint.

19. The method of claim 17, wherein the stake defines a central axis, wherein driving the stake further includes driving the stake such that the central axis is offset from the vertical section of the edge restraint at an angle other than 90 degrees as measured in a plane parallel to the horizontal section.

20. The method of claim 17, wherein a knockout section is provided in the slot, and driving the main body section of a stake through the slot includes punching out the knockout section.

\* \* \* \* \*

UNITED STATES PATENT AND TRADEMARK OFFICE
CERTIFICATE OF CORRECTION

| | | |
|---|---|---|
| PATENT NO. | : 8,915,027 B1 | Page 1 of 1 |
| APPLICATION NO. | : 14/039062 | |
| DATED | : December 23, 2014 | |
| INVENTOR(S) | : James Alfieri, III | |

It is certified that error appears in the above-identified patent and that said Letters Patent is hereby corrected as shown below:

In the Claims

Column 19, line 1, Claim 16, delete "received"

Signed and Sealed this
Thirty-first Day of March, 2015

Michelle K. Lee
*Director of the United States Patent and Trademark Office*